US007933707B2

(12) United States Patent
Berger et al.

(10) Patent No.: US 7,933,707 B2
(45) Date of Patent: Apr. 26, 2011

(54) METHOD FOR TRIGGERING THE CLUTCH MOMENT OF A CLUTCH OF AN AUTOMATED GEAR AND DEVICE FOR IMPLEMENTION OF THE METHOD

(75) Inventors: Reinhard Berger, Buhl (DE); Thomas Weber, Muggensturm (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1756 days.

(21) Appl. No.: 10/907,535

(22) Filed: Apr. 5, 2005

(65) Prior Publication Data
US 2005/0221951 A1 Oct. 6, 2005

(30) Foreign Application Priority Data

Apr. 6, 2004 (DE) .................... 10 2004 016 899

(51) Int. Cl.
*G06F 19/00* (2006.01)

(52) U.S. Cl. ............. 701/67; 701/51; 477/70; 477/176; 192/52.1

(58) Field of Classification Search ............. 701/76, 701/67–68; 477/176, 180, 174, 169, 39, 477/74
See application file for complete search history.

(56) References Cited

U.S. PATENT DOCUMENTS

| 2,488,760 | A | * | 11/1949 | Brown | 235/61 C |
|---|---|---|---|---|---|
| 2,672,503 | A | * | 3/1954 | Hallden et al. | 358/412 |
| 2,817,840 | A | * | 12/1957 | Dennisson et al. | 53/285 |
| 4,590,455 | A | * | 5/1986 | Fritzinger | 340/907 |
| 4,790,418 | A | * | 12/1988 | Brown et al. | 701/51 |
| 5,004,082 | A | * | 4/1991 | Sakakibara et al. | 192/3.26 |
| 5,145,466 | A | * | 9/1992 | Momiyama et al. | 475/86 |
| 5,176,234 | A | * | 1/1993 | Reik et al. | 192/53.2 |
| 5,631,829 | A | * | 5/1997 | Takasaki et al. | 701/69 |
| 5,667,458 | A | * | 9/1997 | Narita et al. | 477/169 |
| 5,674,155 | A | * | 10/1997 | Otto et al. | 477/176 |
| 5,743,828 | A | * | 4/1998 | Kuriyama et al. | 477/169 |
| 5,752,894 | A | * | 5/1998 | Fischer | 477/169 |
| 5,807,209 | A | * | 9/1998 | Matsubara et al. | 477/176 |

(Continued)

FOREIGN PATENT DOCUMENTS

DE 19733465 2/1998

(Continued)

OTHER PUBLICATIONS

On the Use of Torque-Biasing Systems for Electronic Stability Control: Limitations and Possibilities; Piyabongkarn, D.; Lew, J.Y.; Rajamani, R.; Grogg, J.A.; Qinghui Yuan; Control Systems Technology, IEEE Transactions on; vol. 15, Issue 3, May 2007 pp. 581-589; Digital Object Identifier 10.1109/TCST.2007.894656.*

(Continued)

*Primary Examiner* — Cuong H Nguyen
(74) *Attorney, Agent, or Firm* — Simpson & Simpson, PLLC

(57) ABSTRACT

A method is proposed for triggering the clutch moment of a clutch of an automated gear in the power train of a vehicle with the creep function activated, where the clutch moment is triggered as a function of the slippage on the clutch and/or as a function of the speed of the vehicle. Furthermore, a device is proposed for triggering the clutch moment of a clutch of an automated gear, in particular, to implement the abovementioned method where at least one control device is provided which triggers the clutch moment as a function of the slippage on the clutch and/or as a function of the speed of the vehicle.

13 Claims, 2 Drawing Sheets

U.S. PATENT DOCUMENTS

| | | | | |
|---|---|---|---|---|
| 6,102,831 | A * | 8/2000 | Wakahara et al. | 477/169 |
| 6,107,761 | A * | 8/2000 | Seto et al. | 318/139 |
| 6,132,335 | A * | 10/2000 | Fischer | 477/169 |
| 6,402,659 | B1 * | 6/2002 | Inoue | 477/39 |
| 6,633,806 | B2 * | 10/2003 | Gochenour | 701/51 |
| 6,730,001 | B1 * | 5/2004 | Vohmann et al. | 477/176 |
| 7,102,313 | B2 * | 9/2006 | Kadota et al. | 318/465 |
| 7,356,400 | B2 * | 4/2008 | Honma et al. | 701/67 |
| 7,367,924 | B2 * | 5/2008 | Berger et al. | 477/181 |
| 2004/0147367 | A1 * | 7/2004 | Rieger et al. | 477/176 |
| 2005/0221951 | A1 * | 10/2005 | Berger et al. | 477/115 |
| 2006/0016282 | A1 * | 1/2006 | Berger et al. | 74/337 |
| 2008/0059032 | A1 * | 3/2008 | Hofmann | 701/55 |

FOREIGN PATENT DOCUMENTS

| | | |
|---|---|---|
| DE | 10316458 | 10/2003 |
| EP | 1403547 | 6/2005 |
| JP | 2005-066110 | * 3/2005 |
| JP | 2005-164568 | * 6/2005 |
| WO | PCT/EP00/10457 | * 5/2001 |

OTHER PUBLICATIONS

An electric simulator of a vehicle transmission chain coupled to a vehicle dynamic model; Chaibet, A.; Larouci, C.; Grunn, E.; Industrial Electronics, 2008. IECON 2008. 34th Annual Conference of IEEE; Nov. 10-13, 2008 pp. 1578-1583; Digital Object Identifier 10.1109/IECON.2008.4758189.*

Simulation of an electrical variable transmission based on dual mechanical ports electric machine with clutch; Guo Xinhua; Wen Xuhui; Chen Jingwei; Zhao Feng; Guo Xizheng; Vehicle Power and Propulsion Conference, 2008. VPPC '08. IEEE; Sep. 3-5, 2008 pp. 1-5, Digital Object Identifier 10.1109/VPPC.2008.4677476.*

Design and development of few-tooth-deference planetary gear Powertrain Coupling system with biased bent shaft in electric and HEV for all-terrain vehicles Wang Yong-bin et al., Vehicle Power and Propulsion Conference, 2008. VPPC '08. IEEE Sep. 3-5, 2008 pp. 1-5, Digital Object Identifier 10.1109/VPPC.2008.4677698.*

Observer-based optimal control of dry clutch engagement; Dolcini, P.; Bechart, H.; Canudas de Wit, C.; Decision and Control, 2005 and 2005 European Control Conference. CDC-ECC '05. 44th IEEE Conference on Dec. 12-15, 2005 pp. 440-445.*

Model Predictive Control of a Parallel Hybrid Vehicle Drivetrain; Beck, R.; Richert, F.; Bollig, A.; Abel, D.; Saenger, S.; Neil, K.; Scholt, T.; Noreikat, K.-E.; Decision and Control, 2005 and 2005 European Control Conference. CDC-ECC '05. 44th IEEE Conference on, Dec. 12-15, 2005 pp. 2670-2675.*

Simulation and control of an automotive dry clutch; Serrarens, A.; Dassen, M.; Steinbuch, M.; American Control Conference, 2004. Proceedings of the 2004; vol. 5, Jun. 30-Jul. 2, 2004 pp. 4078-4083 vol. 5.*

Engagement control for automotive dry clutch; Glielmo, L.; Vasca, F.; American Control Conference, 2000. Proceedings of the 2000, vol. 2, Jun. 28-30, 2000 pp. 1016-1017 vol. 2; Digital Object Identifier 10.1109/ACC.2000.876654.*

Multi-model of a hybrid electric vehicle's four-wheel drive system with automatically-engaging clutch; Lhomme, W.; Hancock, M.J.; Assadian, F.; Cieslar, D.; Vehicle Power and Propulsion Conference, 2008. VPPC '08. IEEE; Sep. 3-5, 2008 pp. 1-6 Digital Object Identifier 10.1109/VPPC.2008.4677566.*

Development and experimental evaluation of a slip angle estimator for vehicle stability control; Piyabongkarn, D.; Rajamani, R.; Grogg, J.A.; Lew, J.Y.; American Control Conference, 2006; Jun. 14-16, 2006 pp. 6 pp. Digital Object Identifier 10.1109/ACC.2006.1657576.*

On the use of torque-biasing devices for vehicle stability control; Piyabongkarn, D.; Rajamani, R.; Lew, J.Y.; Hai Yu; American Control Conference, 2006; Jun. 14-16, 2006 pp. 6 pp. , Digital Object Identifier 10.1109/ACC.2006.1657575.*

Research and Development of Automatic Transmission Electronic Control System; Weibin Yang; Guangqiang Wu; Jianwu Dang; Integration Technology, 2007. ICIT '07. IEEE International Conference on; Mar. 20-24, 2007 pp. 442-445 Digital Object Identifier 10.1109/ICITECHNOLOGY.2007.4290514.*

Optimal coordinated traffic control of adjacent intersections based on multiple objectives programming techniques; Yuan Erming; Li Biao; Feng Ying; Control Conference, 2008. CCC 2008. 27th Chinese Digital Object Identifier: 10.1109/CHICC.2008.4605626 Publication Year: 2008 , pp. 587-591.*

Research on power density improvement design of an HEV using induction machine based electrical variable transmission; Cui Shumei; Huang Wen-xiang; Zhang Qian-fan; Vehicle Power and Propulsion Conference, 2008. VPPC '08. IEEE Digital Object Identifier: 10.1109/VPPC.2008.4677790; Publication Year: 2008 , pp. 1-4.*

The design of wheel retraction function of amphibious vehicle; Song Guixia; Zhao Youqun; Vehicle Power and Propulsion Conference, 2008. VPPC '08. IEEE; Digital Object Identifier: 10.1109/VPPC.2008.4677693; Publication Year: 2008 , pp. 1-4.*

Direct Yaw-Moment Control of an In-Wheel-Motored Electric Vehicle Based on Body Slip Angle Fuzzy Observer; Cong Geng; Mostefai, L.; Denai, M.; Hori, Y.; Industrial Electronics, IEEE Transactions on; vol. 56 , Issue: 5; Digital Object Identifier: 10.1109/TIE.2009.2013737; Publication Year: 2009 , pp. 1411-1419.*

Constrained convergent gait regulation for a climbing robot; Trujillo, S.; Heyneman, B.; Cutkosky, M.; Robotics and Automation (ICRA), 2010 IEEE International Conference on; Digital Object Identifier: 10.1109/ROBOT.2010.5509242 Publication Year: 2010 , pp. 5243-5249.*

Optimal Power Train Design of a Hybrid Refuse Collector Vehicle; Knoke, T.; Bocker, J.; Vehicle Power and Propulsion Conference, 2007. VPPC 2007. IEEE; Digital Object Identifier: 10.1109/VPPC.2007.4544237 Publication Year: 2007.*

Drive train design for medium-sized zero emission electric vehicles; Morrison, P.; Binder, A.; Funieru, B.; Sabirin, C.; Power Electronics and Applications, 2009. EPE '09. 13th European Conference on; Publication Year: 2009 , pp. 1-10.*

Test bench for the simulation of a hybrid power train; Gauchia, L.; Martinez, J.M.; Chinchilla, M.; Sanz, J.; Power Electronics and Applications, 2007 European Conference on; Digital Object Identifier: 10.1109/EPE.2007.4417235 Publication Year: 2007 , pp. 1-8.*

* cited by examiner

METHOD FOR TRIGGERING THE CLUTCH MOMENT OF A CLUTCH OF AN AUTOMATED GEAR AND DEVICE FOR IMPLEMENTION OF THE METHOD

FIELD OF THE INVENTION

This invention relates to a method for triggering the clutch moment of a clutch of an automated gear in the power train of a vehicle with activated creep function. The invention furthermore relates to a device especially for the implementation of the method for triggering the clutch moment.

BACKGROUND OF THE INVENTION

Publication DE 197 33 465 A1 discloses an arrangement for the control of an automated clutch and a method for controlling an automated clutch of a motor vehicle, in particular, at low vehicle speeds. The known arrangement displays means for acquiring the operation of the brake pedal, the backward-rolling and the forward-rolling motions whose output signals are associated with a decision-making device, which decides in accordance with the output signals as to what driving state prevails and that, in keeping with the driving state, passes the control of the automated clutch on to various control devices connected with the decision-making device. The several control devices control the automated clutch in such a way that the vehicle—in case of slow-moving vehicle speeds—will behave like a vehicle with a hydrodynamic torque converter.

Furthermore, publication DE 102 28 029 A1 (also U.S. Patent Application Publication 2004/0147367 A1) discloses a method for changing the clutch moment of a clutch in the power train of a vehicle with an automated gearbox. In the known method, the clutch moment is changed as a function of a variable vehicle operating parameter that describes the creep phase of the vehicle. This means that one or several operating parameters of the vehicle are monitored and they describe a slow drive or a creep drive of the vehicle and the moment, transmitted by the clutch, is altered as a function of the operating parameter or the operating parameters.

In this way, one can make sure that the creep run of the vehicle can be improved without the danger of choking the engine because one now analyzes not only just one digital information item in the form of the brake light switch but rather one or several operating parameters that describe the creep run of the vehicle and that do not change in a digital manner. For example, if there is the danger that the engine might be choked, the coupling moment first of all can be reduced at higher speed, specifically as a function of the chosen operating parameter and, thereafter, the coupling moment is reduced with a lower speed so that comfortable creep run is available when compared to a linear reduction of the speed of the clutch moment.

The object of the invention is to propose a method and a device o the initially mentioned types that will further improve creep performance in vehicles with automated gears.

This problem can be solved by an invention-based method for triggering the clutch moment of a clutch of an automated gear in the power train of a vehicle with the creep function activated, whereby the clutch moment is triggered as a function of the slippage on the clutch and/or as a function of the speed of the vehicle.

In this way, one can implement a creep strategy that is a function of the slippage of the speed for a vehicle with an automated mechanical gear and friction clutches. In particular, if there is a great slippage on the clutch, one can also transmit a big moment, which means that when starting the creep from a standstill, the maximum creep moment is transmitted, which then can decrease steadily as the slippage rotation number declines or as the vehicle speed increases. Provision can be made that no moment is transmitted any longer when the drive and the power takeoff are in synchronism.

The following can be provided as another aspect of the invention: A required clutch moment is determined at least as a function of a given slippage rotation number of the clutch. When the vehicle is in a creep phase, one can thus determine the required clutch moment preferably on the basis of a nominal slippage rotation number. The nominal slippage rotation number, for example, can be determined from the difference between the engine idling rotation number and a rotation number on the power takeoff side. For example, the difference can be defined from the nominal idling revolution number of the engine and the current (calculated) primary gear shaft revolution number. As an alternative, for example, one can also use a measured wheel revolution number as the revolution number on the power takeoff side.

This means that the creep moment depends not primarily directly on the actual current engine revolution number so that any possible fluctuations in the engine revolution number and the required clutch moment can be avoided, something that may arise in place of calculation by using the real slippage on the clutch. These [fluctuations] can, for example, be considered directly only at very low real engine revolution numbers, whereby the required clutch moment in such cases is not further increased or reduced in order to avoid choking the engine.

The following can be provided as part of an advantageous development of this invention: The required clutch moment is determined from a function that is in proportion to the nominal slippage revolution number or the like, whereby the required clutch moment is limited in a suitable manner by magnitudes that can be calibrated. For example, the particular required clutch moment can be limited upward by a maximum required clutch moment of $M_{max}$ up to a minimal vehicle speed of $V_{min}$. A minimal required clutch moment $M_{min}$ can be limited downward starting as of a maximum vehicle speed of $V_{max}$.

Entry into the creep phase can take place both when the vehicle is at a standstill and when the vehicle is moving. In order in spite of the great initial clutch moment that is required for the desired operating mode always to attain gentle transitions without any noticeable knocks during creeping, one can in the case of the invention-based method use calibratable, time-dependent and/or nominal slippage-dependent ramp functions with different gradients to build up the required clutch moments, whereby the particular current required clutch moment is determined as starting value for a maximum value as a function of the nominal slippage.

When there is a cyclic run during a creep phase, then after the calculation of a maximum clutch moment, one can determine whether an applicable starting ramp function need no longer be used, which [moment] is a function of the level of the clutch moment upon entry into the creep phase and on the time elapsed since then.

When the applicable starting ramp function is not used, then one can determine whether a second ramp function through which one should run in any case is already terminated. If this is not the case, then the required clutch moment can be calculated according to the second ramp function in keeping with the invention-based method, whereby after termination of the ramp functions, the required clutch moment during the creep phase can always be set at the maximum value calculated at the beginning.

The following can be provided as a further development of the invention: The invention-based method also implements suitable choking protection when the clutch moment is triggered. Preferably, as part of the clutch protection, one can determine whether the particular current engine revolution number is above an applicable boundary revolution number for the choke protection. When the current engine revolution number is above that boundary value revolution number, then one can provide, for example, that the calculated required clutch moment be retained. On the other hand, when the boundary revolution number is not reached, then, for example, one can make provision for the immediate opening of the clutch or the like. Otherwise, for example, by means of a corresponding time criterion, one can decide as to the retention of the clutch moment from the prior run through the creep phase or as to a gradual reduction of the clutch moment.

Furthermore, the object of the invention can also be attained by a device to trigger the clutch moment of a clutch of an automated gear in the power train of a vehicle when the creep function is activated, whereby at least one control device is provided, which [control device] triggers the clutch moment as a function of the slippage on the clutch and/or as a function of the speed of the vehicle.

In particular, the proposed can also be used to implement the invention-based method. Use especially in vehicles with automated gearshifts or a parallel switching gear would make very good sense.

Summarizing, the creep performance or the creep starting performance of a vehicle with a parallel switching gear can be improved by the invention-based method in that the slippage-dependent creep performance [is] made to resemble vehicles with automatic transmission that are equipped with a hydraulic converter [sic]. In the invention-based solution, the required clutch moment is determined not on the basis of the real slippage but rather on the basis of a nominal slippage revolution number as the difference between a required or nominal idling revolution number and a calculated primary gear shaft revolution number. In that way, one can avoid fluctuations in the engine revolution number and the clutch moment. The particular current engine revolution number preferably can be considered to prevent the engine from being choked. In order to get gentle, knock-free transitions to the creeping mode in a stationary and a moving vehicle, the required clutch moment can be reduced via calibratable, time-dependent and clutch-moment-dependent ramp functions.

BRIEF DESCRIPTION OF THE DRAWINGS

The invention is explained further with reference to the drawings.

DETAILED DESCRIPTION OF THE INVENTION

Figure 1:
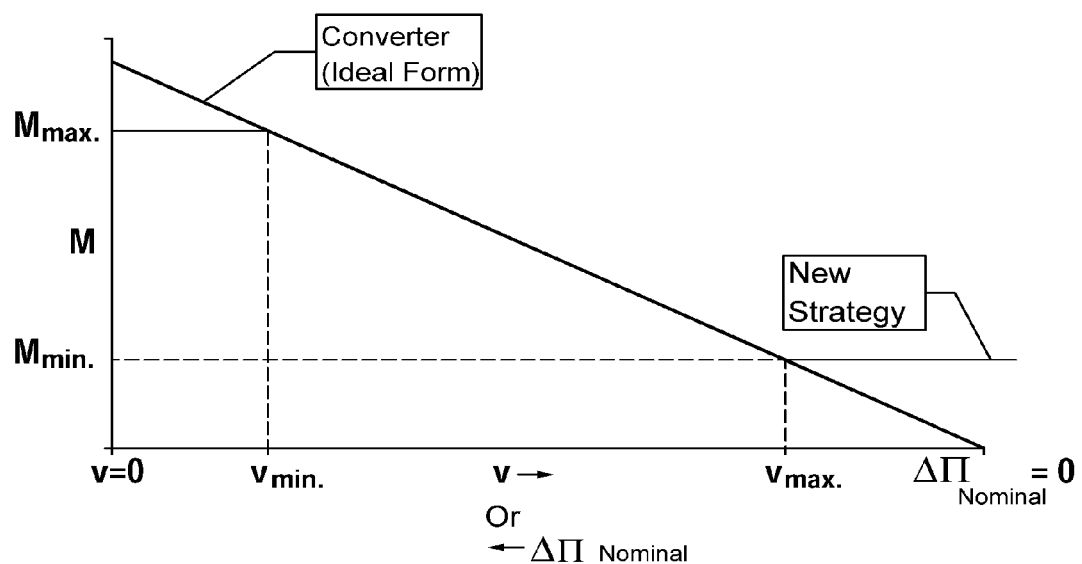
FIG. 1 required clutch moment development curves against vehicle speed.

FIG. 1 illustrates a possible strategy according to the invention-based method for calculating the required clutch moment from a function that is proportional to the nominal slippage revolution number, whereby for comparison purposes, a required clutch moment development curve in a gear with a hydrodynamic converter is illustrated additionally.

The invention-based required clutch moment development curve is limited upward or downward by calibratable magnitudes. The limitation takes place upward by virtue of the maximum required clutch moment value $M_{max}$, which exists up to a minimal vehicle speed $V_{min}$. After that, the required clutch moment development curve is illustrated by a ramp function, which exists up to a maximum vehicle speed of $V_{max}$ where the minimal required clutch moment value $M_{min}$ is then limited.

Entry into the creeping phase can take place both when the vehicle is at a standstill and when the vehicle is moving. Calibratable ramp functions, depending on the time and the nominal slippage, functions that display different gradients for the purpose of building up the required clutch moment, are used in order always during the creeping mode to achieve gentle transitions without noticeable knocks in spite of the big initial moments that are necessary to achieve the desired performance modes. The current required clutch moment is used as a starting value here and the maximum value is determined as a function of the nominal slippage.

Figure 2:
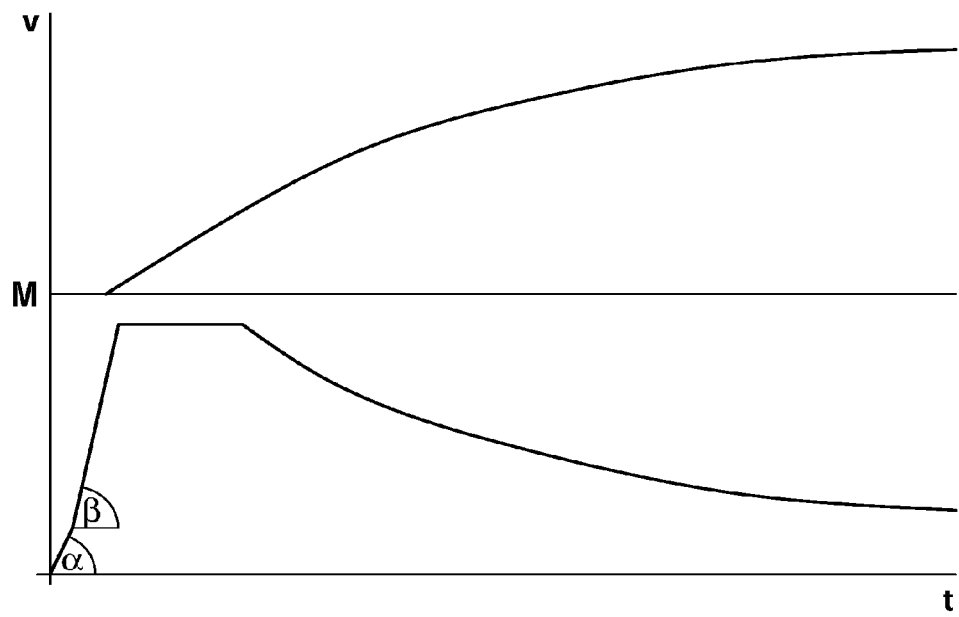
FIG. 2 a development curve of the required coupling moment and the vehicle speed when starting the creep mode from a standstill [plotted] against the time.

This procedure is shown by way of example in FIG. 2; here, the development curve of the clutch moment and the vehicle speed is plotted against the time during the star of the creeping mode from a standstill. Starting with the clutch moment when the vehicle is at a standstill (0 Nm), the moment is built up via two successive ramp functions with the gradients of α or β until the maximum value of the required clutch moment has been reached. The ramp function, shown in FIG. 1, kicks in as of that point in time.

Figure 3:
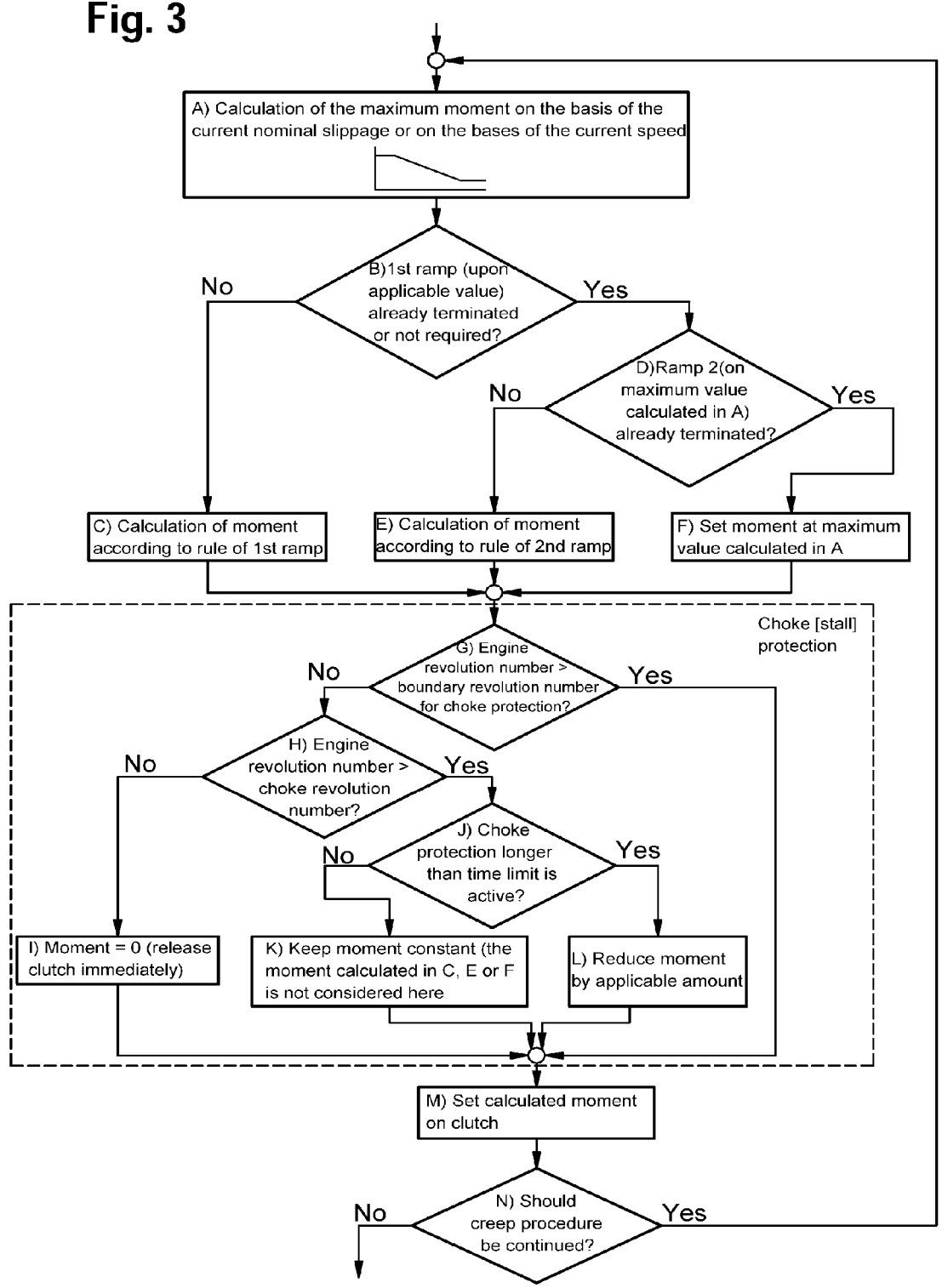
FIG. 3 a flow chart diagram showing an invention-based required clutch moment calculation during the creeping mode with choke [stall] protection.

FIG. 3 shows a flow chart diagram for the calculation of the required clutch moment according to the invention-based method by way of example during the creeping mode, which indicates the course of development such as it is run through cyclically during a creep phase.

After the calculation of the current maximum clutch moment (A), which is a function of the nominal slippage or the speed, one checks to see whether the applicable starting ramp function need no longer have to be run through (B). That depends, first of all, on the level of the clutch moment upon entry into the creeping phase and, besides, on the period of time that has elapsed since then. If this is not the case, then the required clutch moment will be calculated as a function of the application of the first ramp function (C); otherwise, a test is made to determine whether the second ramp function through which one must run in any case has already been terminated (D). If not, then the required clutch moment is calculated according to the rule of the second ramp function (E). After the termination of the ramp functions, the required clutch moment is always set at the maximum value (F) calculated with (A) during the creep phase.

A series-connected choke [stall] protection unit is illustrated by way of example in the lower part of the flow chart diagram shown in FIG. 3. The clutch moment, calculated during process steps (A) to (F), can be retained if the current engine revolution number is above an applied limit for the activation of the choke [stall] protection (G). Otherwise, the procedure is used to test whether the current engine revolution number runs counter to the specified choke [stall] revolution number, whereby the clutch is immediately opened (I) whenever the revolution number boundary is not reached. Otherwise, there can be a time criterion (J) concerning the retention of the clutch moment from the prior run (K) or a gradual reduction of the required clutch moment (L).

What is claimed is:

1. A method for triggering a clutch moment of a clutch of an automated gear in a power train of a vehicle, comprising the steps of:

activating a creep function using a control device; and, triggering, using the control device, the clutch moment as a function of a slippage or as a function of a speed of the vehicle, wherein a required clutch moment is determined at least as a function of a given slippage revolution number of the clutch, wherein a nominal slippage revolution number is used as the slippage revolution number, which nominal slippage revolution number is determined from a difference between an engine idling revolution number and a power takeoff revolution number, and wherein the required clutch moment is determined on the basis of a function that is proportional to the nominal slippage revolution number, and the required clutch moment is limited by calibratable magnitudes.

2. The method according to claim 1, further comprising implementing suitable choking protection when the clutch moment is triggered.

3. The method according to claim 2, wherein a determination is made whether the particular engine revolution number is above an applicable boundary revolution number for choke stall protection.

4. The method according to claim 3, wherein a calculated required clutch moment is retained when the engine revolution number is above an applicable boundary revolution number.

5. The method according to claim 1, wherein a maximum required clutch moment (Mmax) is set up to a minimum speed (Vmin) and wherein a minimum required clutch moment (Mmin) is set as of a maximum speed (Vmax).

6. The method according to claim 1, wherein the nominal engine idling revolution number or the required engine idling revolution number is used as the engine idling revolution number.

7. The method according to claim 1, wherein a current primary gear shaft revolution number or a calculated primary gear shaft revolution number is used as the power takeoff revolution number.

8. The method according to claim 1, wherein at least one measured wheel revolution number is used as the power takeoff revolution number.

9. The method according to claim 1, wherein while a vehicle is in a creep phase after the calculation of a maximum clutch moment (Mmax), a determination is made as a function of the nominal slippage revolution number or the speed whether an applicable starting ramp function is no longer used, something that depends on the value of the clutch moment at the start of the creep phase and on the time interval.

10. The method according to claim 9, wherein when the applicable start ramp function is used, the required clutch moment is calculated as a function of the application of a first ramp function.

11. The method according to claim 9, wherein when the applicable start ramp function is not used, a determination is made whether a second ramp function has been terminated and, if not, the required clutch moment is calculated according to the second ramp function.

12. The method according to claim 9, wherein the required clutch moment is set as limitation after the termination of the ramp functions during the creep phase at the maximum value of the required clutch moment (Mmax).

13. The method according to claim 3, wherein the clutch is immediately opened when the boundary revolution number is not reached.

* * * * *